(12) United States Patent
Todirel et al.

(10) Patent No.: US 11,947,933 B2
(45) Date of Patent: Apr. 2, 2024

(54) CONTEXTUAL ASSISTANCE AND INTERACTIVE DOCUMENTATION

(71) Applicant: Microsoft Technology Licensing, LLC, Redmond, WA (US)

(72) Inventors: Ion Todirel, Bellevue, WA (US); Bogdan Ionut Mihalcea, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 17/144,690

(22) Filed: Jan. 8, 2021

(65) Prior Publication Data

US 2022/0222047 A1   Jul. 14, 2022

(51) Int. Cl.
| | |
|---|---|
| *G06F 9/44* | (2018.01) |
| *G06F 8/33* | (2018.01) |
| *G06F 8/73* | (2018.01) |
| *G06F 9/451* | (2018.01) |
| *G06F 11/14* | (2006.01) |
| *G06F 11/36* | (2006.01) |
| *G06N 20/00* | (2019.01) |

(52) U.S. Cl.
CPC .................. *G06F 8/33* (2013.01); *G06F 8/73* (2013.01); *G06F 9/453* (2018.02); *G06F 11/1471* (2013.01); *G06F 11/3608* (2013.01); *G06N 20/00* (2019.01)

(58) Field of Classification Search
None
See application file for complete search history.

(56) References Cited

U.S. PATENT DOCUMENTS

| | | |
|---|---|---|
| 7,657,868 B2 | 2/2010 | Shenfield et al. |
| 8,245,186 B2 | 8/2012 | Gryko et al. |
| 8,595,685 B2 | 11/2013 | Sharma et al. |

(Continued)

OTHER PUBLICATIONS

Sielis, et al., "ArchReco: a software tool to assist software design based on context aware recommendations of design patterns", In Journal of Software Engineering Research and Development, vol. 5, Issue 1, Dec. 1, 2017, pp. 1-36.

(Continued)

*Primary Examiner* — Insun Kang
(74) *Attorney, Agent, or Firm* — Ogilvie Law Firm

(57) ABSTRACT

Some embodiments track internal actions of a development tool, and actions of a user of the tool. When the user faces a problem, information about the problem state is matched to a mitigation graph that was built from other user's sessions with the tool. Then documentation contextualized to the problem is synthesized, e.g., using machine learning models, and presented to the user. In addition to text and images, the documentation may include interaction points such as hyperlinks or buttons associated with code that mitigates the problem. For example, a mitigation sequence may proactively instruct the tool to perform certain actions such as an install or build or undo, or may automatically operate the tool user interface proactively in place of the user. Mitigation sequences may be sorted, and subjected to cost or outcome desirability prioritization. An administration tool provides mitigation graph management functionality. Personally identifiable information presence is constrained.

20 Claims, 4 Drawing Sheets

(56) References Cited

U.S. PATENT DOCUMENTS

| | | | |
|---|---|---|---|
| 8,869,097 | B2 | 10/2014 | Asadullah et al. |
| 9,383,973 | B2 | 7/2016 | Villar et al. |
| 10,503,478 | B2 | 12/2019 | Maurya et al. |
| 11,269,876 | B1* | 3/2022 | Basavaiah ................ G06F 8/77 |
| 2004/0031017 | A1 | 2/2004 | Vaidyanathan et al. |
| 2009/0300641 | A1* | 12/2009 | Friedman ............ G06F 11/3664 |
| | | | 718/104 |
| 2011/0010645 | A1 | 1/2011 | Mihalcea |
| 2014/0137257 | A1 | 5/2014 | Martinez et al. |
| 2015/0331673 | A1 | 11/2015 | Mihalcea |
| 2016/0077831 | A1 | 3/2016 | Mihalcea et al. |
| 2016/0078361 | A1* | 3/2016 | Brueckner ............ G06N 20/00 |
| | | | 706/12 |
| 2016/0321033 | A1 | 11/2016 | Mihalcea et al. |
| 2016/0321055 | A1 | 11/2016 | Mihalcea et al. |
| 2017/0277664 | A1* | 9/2017 | Mihalcea ............. G06F 40/146 |
| 2017/0277742 | A1 | 9/2017 | Arkhipova et al. |
| 2017/0286064 | A1 | 10/2017 | Mihalcea et al. |
| 2017/0329582 | A1* | 11/2017 | Steven .................. G06F 16/951 |
| 2020/0160190 | A1* | 5/2020 | Swamy ................. G06F 40/279 |
| 2020/0320619 | A1* | 10/2020 | Motaharian ........... G06N 20/20 |
| 2021/0352099 | A1* | 11/2021 | Rogers ................... G06N 20/00 |
| 2022/0036270 | A1* | 2/2022 | Benyo ................... G06F 9/5027 |

OTHER PUBLICATIONS

Carlos Chang, "Oracle Enhances Oracle Digital Assistant with Multilingual Capabilities", retrieved from <<https://blogs.oracle.com/mobile/oracle-enhances-oracle-digital-assistant-with-multilingual-capabilities-v2>>, Jul. 28, 2020, 6 pages.

"Comparison of documentation generators", retrieved from <<https://en.wikipedia.org/wiki/Comparison_of_documentation_generators>>, Nov. 19, 2020, 7 pages.

"pseudomuto/protoc-gen-doc", retrieved from <<https://github.com/pseudomuto/protoc-gen-doc>>, Sep. 10, 2020, 6 pages.

"Documentation tool window", retrieved from <<https://www.jetbrains.com/help/idea/documentation-tool-window.html>>, Oct. 21, 2020, 4 pages.

"Intel® Agilex™ FPGAs and SOCs Support", retrieved from <<https://www.intel.com/content/www/us/en/programmable/products/agilex-series/ag/support/tools.html>>, no later than Dec. 10, 2020, 5 pages.

Zhendon, "Xilinx Online Support Resources—where to find them and which should you use?", retrieved from <<https://forums.xilinx.com/t5/Design-and-Debug-Techniques-Blog/Xilinx-Online-Support-Resources-where-to-find-them-and-which/ba-p/1096467>>, Apr. 16, 2020, 16 pages.

"NVIDIA Developer Tools Overview", retrieved from <<https://developer.nvidia.com/tools-overview>>, no later than Dec. 10, 2020, 5 pages.

Brian Wood, Erica Larson, "Add interactivity", retrieved from <<https://helpx.adobe.com/indesign/how-to/create-interactive-document.html>>, Oct. 15, 2018, 5 pages.

"GPT-3", retrieved from <<https://en.wikipedia.org/wiki/GPT-3>>, Dec. 13, 2020, 5 pages.

"Cosmos DB", retrieved from <<https://en.wikipedia.org/wiki/Cosmos_DB>>, Dec. 3, 2020, 7 pages.

"Instrumentation (computer programming)", retrieved from <<https://en.wikipedia.org/wiki/Instrumentation_(computer_programming)>>, May 4, 2020, 2 pages.

"Decision tree", retrieved from <<https://en.wikipedia.org/wiki/Decision_tree>>, Oct. 13, 2020, 6 pages.

"Game tree", retrieved from <<https://en.wikipedia.org/wiki/Game_tree>>, May 11, 2020, 3 pages.

"Minimax", retrieved from <<https://en.wikipedia.org/wiki/Minimax>>, Dec. 4, 2020, 9 pages.

"Decision theory", retrieved from <<https://en.wikipedia.org/wiki/Decision_theory>>, Dec. 12, 2020, 8 pages.

"Intelligent code completion", retrieved from <<https://en.wikipedia.org/wiki/Intelligent_code_completion>>, Feb. 7, 2019, 5 pages.

"What is the Jupyter Notebook?", retrieved from <<https://nbviewer.jupyter.org/github/jupyter/notebook/blob/master/docs/source/examples/Notebook/What%20is%20the%20Jupyter%20Notebook.ipynb>>, no later than Feb. 24, 2020, 3 pages.

"Microsoft Program Synthesis using Examples SDK", retrieved from <<https://microsoft.github.io/prose/>>, no later than Apr. 1, 2020, 2 pages.

"Tutorial", retrieved from <<https://microsoft.github.io/prose/documentation/prose/tutorial/>>, no later than Apr. 1, 2020, 13 pages.

"Domain-specific language", retrieved from <<https://en.wikipedia.org/wiki/Domain-specific_language>>, Dec. 5, 2020, 12 pages.

"International Search Report and Written Opinion Issued in PCT Application No. PCT/US21/061045", dated Mar. 17, 2022, 13 Pages.

* cited by examiner

CONTEXTUAL ASSISTANCE AND INTERACTIVE DOCUMENTATION

BACKGROUND

Some software programs interact directly with people to get commands and input, and to display results. Of these, many programs permit a vast number of different user interaction sequences, some of which may get better results than others. To help people make better use of these programs, various kinds of program documentation may be provided, such as user manuals, tutorials, reviews, user group forum discussions, program developer or vendor blog postings, release notes, and technical support chat sessions. Such program documentation often contains helpful information, but it can be very challenging for a user to find relevant information, even with the help of search aids such as tables of content, headings, indexes, and keyword search engines.

Accordingly, improvements that make relevant program documentation easier to obtain would be beneficial.

SUMMARY

Some embodiments compare a current situation of a program user who is trying to solve a particular problem using a program as a development tool, to a mitigation graph that represents user actions noted and program actions noted during interactions between a copy of the program and other users. After mapping the current problem to the mitigation graph, an embodiment offers possible interaction sequences to the current user, based on the results obtained by other users who pursued the same or different interaction sequences.

In some cases, interaction sequences are presented as documentation that is contextualized to the current problem; this documentation is synthesized live during the current user's session. The synthesized contextual documentation may also be interactive, in that it contains more than mere text and images; receiving a user click or button press in the synthesized documentation may mitigate the current problem, e.g., by instructing the program to perform certain commands, or by installing certain additional or updated software or data. Other contextual assistance and interactive documentation tools and techniques are also described herein.

Some development tool user assistance embodiments use or provide a computing hardware and software combination which includes a digital memory and a processor which is in operable communication with the memory. The processor is configured, e.g., by tailored software, to perform development tool user assistance steps, that is, providing assistance to a user of a development tool. Such an embodiment may include a development tool having a user interface. The development tool user assistance steps may include (a) obtaining development problem information from the development tool, (b) mapping the development problem information to a problem matching node in a mitigation graph which has multiple nodes, the mitigation graph nodes collectively representing actions by users during development tool sessions, the mitigation graph also containing action metadata which indicates action cost or action desirability or both, (c) based at least in part on the problem matching node and the action metadata, identifying at least one action sequence for mitigating the development problem, and (d) visually presenting the at least one action sequence to a current user of the development tool.

Some embodiments use or provide steps for a method for development tool user assistance. The steps may include: obtaining development problem information from a development tool; mapping the development problem information to a problem matching node in a mitigation graph which has multiple nodes, the mitigation graph nodes collectively representing actions by users during development tool sessions, the mitigation graph also containing action metadata which indicates action cost or action desirability or both; synthesizing documentation based at least in part on the problem matching node and the action metadata; and visually presenting the synthesized documentation to a current user of the development tool.

Some embodiments use or provide a computer-readable storage medium configured with data and instructions, or use other computing items, which upon execution by a processor cause a computing system to perform a method for development tool user assistance. This method includes: obtaining development problem information from a development tool; mapping the development problem information to a problem matching node in a mitigation graph which has multiple nodes, the mitigation graph nodes collectively representing actions by a set of users and multiple development tool sessions, the mitigation graph also containing action metadata which indicates action cost or action desirability or both; selecting a development problem mitigation action sequence based on the action metadata; synthesizing interactive contextual documentation based at least in part on the problem matching node and the action metadata, the synthesized interactive contextual documentation including at least one interaction interface for activation of the development problem mitigation action sequence; and visually presenting the synthesized interactive contextual documentation to a current user of the development tool.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
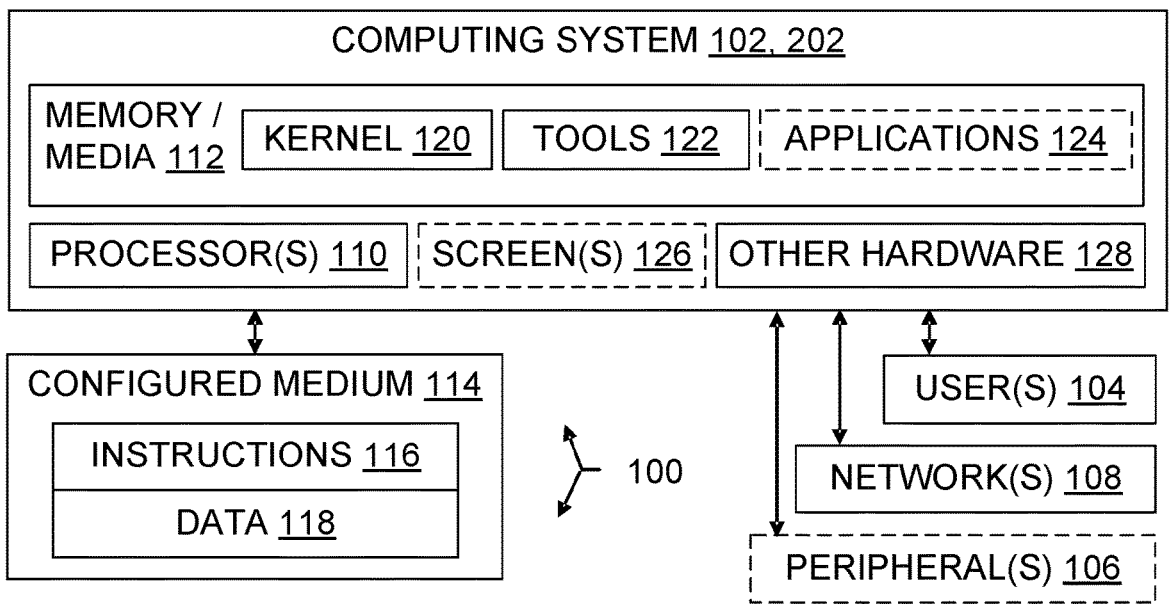
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the usability, efficiency, and effectiveness of Microsoft software development tool offerings, including versions of Microsoft integrated development environments, e.g., Visual Studio Code™ and Visual Studio® software development environments (marks of Microsoft Corporation).

However, teachings herein also apply to other software development tools. Indeed, teachings herein may also be implemented to enhance other kinds of development tools, e.g., computer aided design tools, 2D or 3D modeling tools, animation tools, graphic design tools, project management tools, industrial control tools, semiconductor layout tools, and many other tools that have user interfaces which present human users with hundreds of (or more) possible interaction sequences.

In particular, teachings herein can be applied to supplement existing documentation for such development tools, by synthesizing documentation that is contextualized to a particular user's current problem. Synthesized documentation may be based on activity by other users faced with the same or similar problems. In some cases, the synthesized documentation may also enable an enhanced documentation system to go beyond document display operations, by providing interactivity in order to mitigate the user's current problem, such as by instructing the development tool or installing additional software or data.

The innovators observed familiar documentation systems which are static and lack intelligence for actively tailoring documentation to a current problem and proactively suggesting courses of action. Once a user is no longer a novice in the use of a particular tool, finding relevant documentation to solve particular problems that occur during use of the tool can be difficult.

By contrast, some embodiments described herein provide relevant documentation in a dynamic and reactive manner, allowing users to employ the documentation to interact with other software to mitigate the user's current problem, and toiling on behalf of the user. Some documentation provided in such embodiments is contextual, and branching, so a user need not spend time and attention on information that is not relevant to the user's current problem. In some embodiments, documentation content is automatically triggered and presented to the user. If a problem occurs while the user is using the enhanced development tool, the user is alerted promptly to the problem, and given mitigation suggestions, in a dynamic manner.

In view of the foregoing, some embodiments described herein help users help themselves automatically, reduce tool interaction friction, improve productivity, reduce or remove maintenance, help users solve problems and get unblocked, improve vendor communication with users, and increase efficiency and productivity, freeing development tool user time for other work.

Thus, a technical challenge faced by the innovators was to how to automatically and efficiently determine a development tool user's current situation and compare it to similar or identical situations previously faced by other users of the development tool. One emergent subsidiary challenge was to determine what aspects of a user's current situation should be monitored, and also what aspects should not be monitored. Another technical challenge was how to present suggestions to the current user to help mitigate problems faced in the current situation. One of skill will recognize these and other technical challenges as they are addressed at various points within the present disclosure.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, functionality for development tool user assistance, such as problem contextualized documentation synthesis and presentation functionality, could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
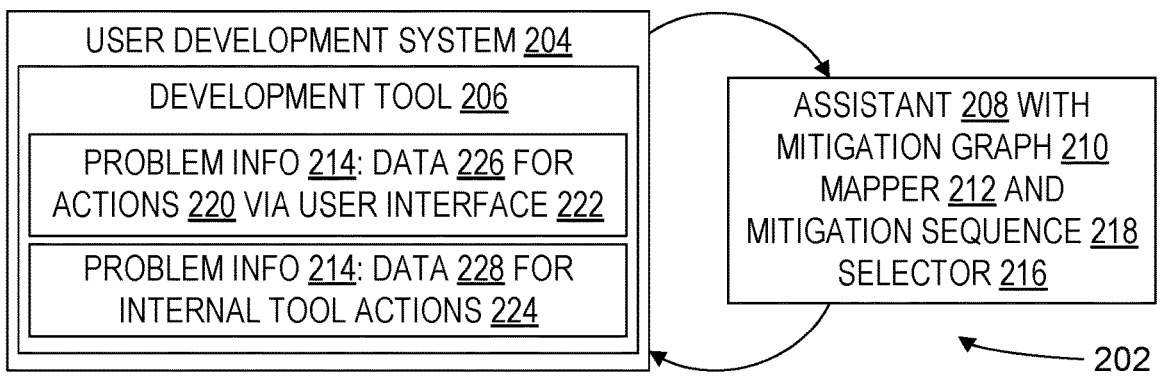
FIG. 2 is a block diagram illustrating a computing system equipped with development tool user assistance functionality in a first configuration.
Figure 3:
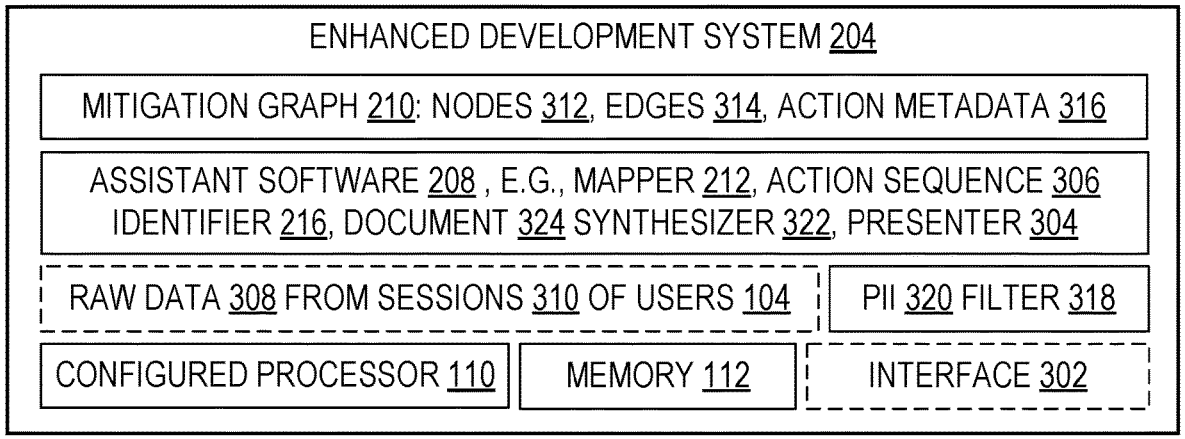
FIG. 3 is a block diagram illustrating a computing system equipped with development tool user assistance functionality in a second configuration.

FIGS. 2 through 6 illustrate an environment having an enhanced system 204, 102 that includes functionality 202 for development tool user assistance. In some embodiments, the functionality 202 is divided between different machines 102, as indicated in FIG. 2, while in others the functionality 202 resides on a single machine 102, as indicated in FIG. 3.

Although FIG. 2 and FIG. 3 also differ in other ways, those other differences are not unique to a multiple machine configuration (e.g., per FIG. 2) or to a single machine configuration (e.g., per FIG. 3). Rather, a multiple machine configuration may include items that are shown expressly in FIG. 2 or in FIG. 3 or both, and likewise a single machine configuration may include items that are shown expressly in FIG. 2 or in FIG. 3 or both.

Also, machines or processes within an enhanced system 204 may be networked generally or communicate in particular (via network or otherwise) with one another and with external devices (e.g., public search engines, public translation engines) through one or more interfaces 302. An interface 302 may include hardware such as network interface cards, software such as network stacks, APIs, or sockets, combination items such as network connections, or a combination thereof.

The illustrated enhanced systems 204 include a development tool 206 which is enhanced to include or to communicate with a software-implemented assistant 208, which may also be referred to as "assistance software" or "user assistance software" or the like. The development tool user assistance functionality 202 includes at least the assistance software 208 and its constituent data structure functionality, and the enhancements that allow the development tool 206 to communicate with the assistance software 208.

The illustrated assistance software 208 data structure functionality includes at least a mitigation graph 210, a mapper 212 that maps problem info 214 to the mitigation graph 210, a mitigation sequence selector 216 that selects a mitigation sequence 218 based on the mapped problem info and the mitigation graph, and a mitigation sequence presenter 304 that presents one or more selected mitigation sequences 218 to the user 104 to assist the user with problem mitigation.

The mitigation graph 210 includes nodes 312 connected by edges 314, and action metadata 316. The action metadata 316 may be implemented as part of the nodes 312, as part of the edges 314, or both. The action metadata 316 includes or is derived computationally from user action data 226 and internal tool action data 228. Examples of action metadata 316 are discussed at various points herein. Some embodiments include a filter 318 which excludes or anonymizes personally identifiable information 320 that is in the action data 226, 228 so that vulnerable PII 320 is not part of the action metadata 316.

Mitigation sequences 218 are examples of action sequences 306; mitigation sequences 218 list user actions 220 that may be triggered through a user interface 222, whereas action sequences 306 may list user actions 220 or internal tool actions 224 or both. An action sequence 306 includes one or more actions 220 or 224. User action data 226 representing a user action 220 may include, e.g., interaction events such as clicks received, pages displayed, commands selected, input received through dialogs, and the like, extracted from raw data 308 such as logs or packets that are created automatically during tool usage sessions 310. Internal action data 228 representing an internal tool action may include, e.g., automatic updates received, automatic culling of expired data, garbage collection or backups or other memory management actions, security handshakes or encryption protocol negotiations, communication retries, checksum calculations, and the like.

Some embodiments include a document synthesizer 322 that synthesizes documentation 324. Although synthesized documentation 324 may be presented, e.g., in a web browser or a dialog or other familiar text or image presentation formats, of greater interest is the ability of some enhanced systems to synthesize documentation 324 that is contextualized to the user's current situation during a tool 206 usage session 310. For example, the documentation 324 may present one or more mitigation sequences 218 that are specifically relevant to the current problem info 214. Moreover, some synthesized documentation 324 may include mitigation URLs 402 or other interaction points that have mitigation functionality beyond the mere presentation of text or images to a user.

Figure 4:
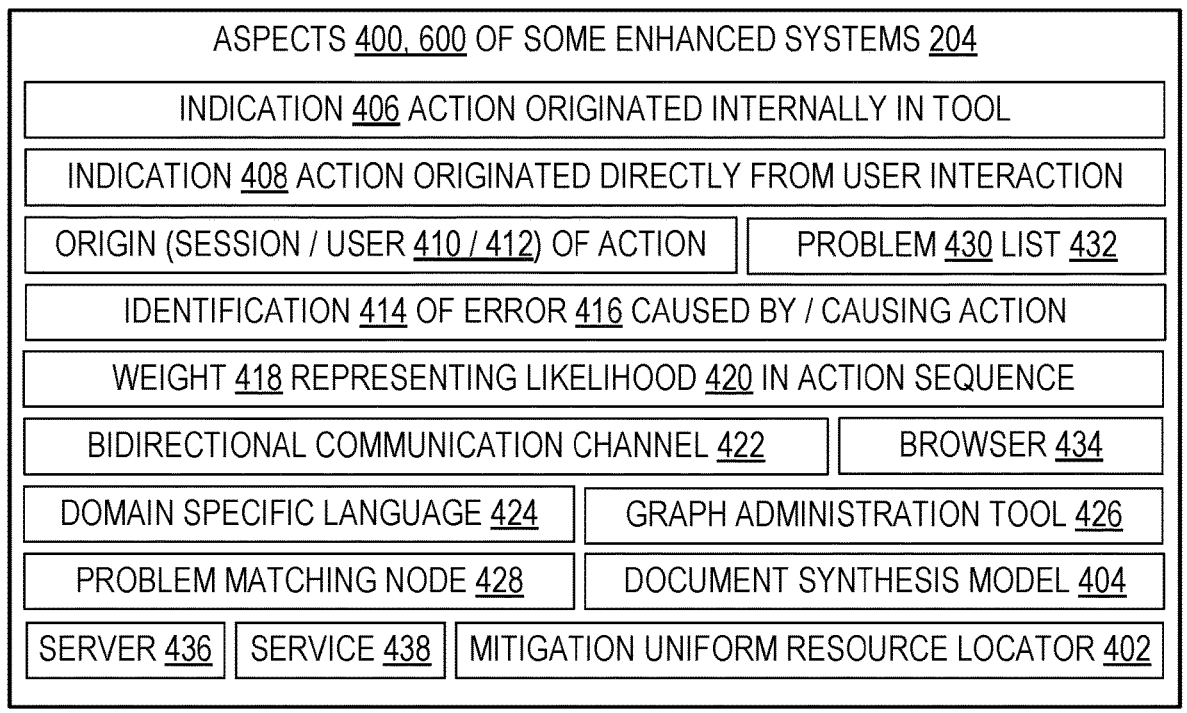
FIG. 4 is a block diagram further illustrating aspects of a computing system that is equipped with development tool user assistance functionality, without regard to a particular configuration.

FIG. 4 illustrates several aspects 400 of enhanced systems 204 in addition to the aspects 400 shown in FIGS. 2 and 3. These items are discussed at various points herein, and additional details regarding them are provided in the discussion of a List of Reference Numerals later in this disclosure document.

Figure 5:
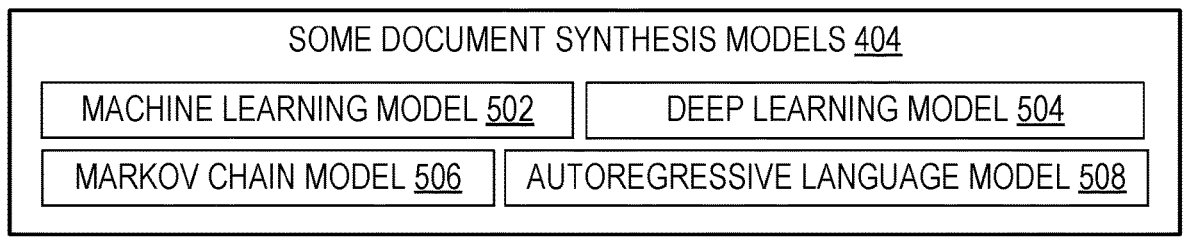
FIG. 5 is a block diagram illustrating document synthesis models.

FIG. 5 illustrates some examples of document synthesis models 404. These items are discussed at various points herein, and additional details regarding them are provided in the discussion of a List of Reference Numerals later in this disclosure document.

Figure 6:
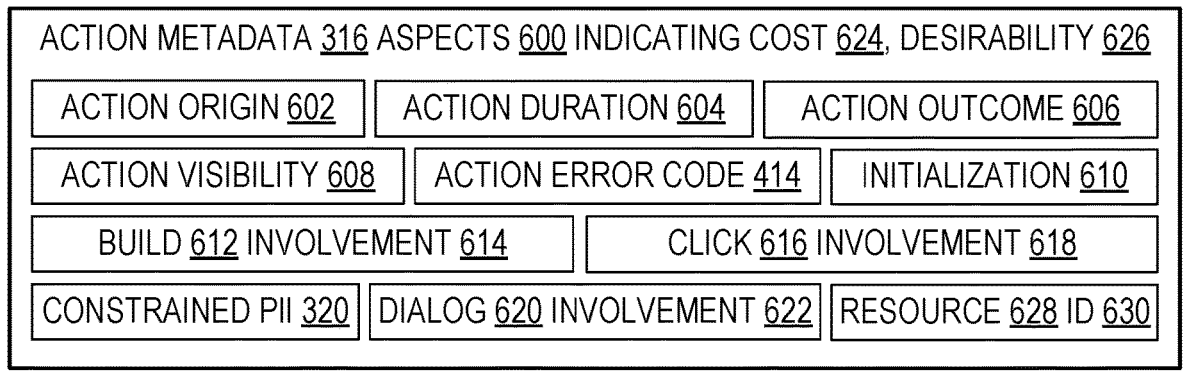
FIG. 6 is a block diagram illustrating aspects of action metadata.

FIG. 6 illustrates several aspects 600 of action metadata 316 in addition to the aspects 600 discussed in connection with FIGS. 2 and 3. These items are discussed at various points herein, and additional details regarding them are provided in the discussion of a List of Reference Numerals later in this disclosure document.

Some embodiments use or provide a functionality-enhanced system, such as system 204 or another system 102 that is enhanced as taught herein. In some embodiments, a system 204 configured for development tool user assistance includes a digital memory 112, a processor 110, and an interactive development tool 206 configured to operate using the digital memory and the processor. The development tool 206 has a user interface 222. The processor 110 is in operable communication with the memory 112. The processor is configured, e.g., with software 208, to perform development tool user assistance steps which include (a) obtaining development problem information 214 from the development tool, (b) mapping the development problem information 214 to a problem matching node 428, 312 in a mitigation graph 210 which has multiple nodes 312, the mitigation graph nodes collectively representing actions 220 by users during development tool sessions 310, the mitigation graph also containing action metadata 316 which indicates action cost 624 or action desirability 626 or both, (c) based at least in part on the problem matching node 428 and the action metadata 316, identifying at least one action sequence 306 for mitigating the development problem, and (d) visually presenting the at least one action sequence 306 to a current user 104 of the development tool 206.

In some embodiments, nodes 312 represent actions 220 taken by the user in the developer tool, with metadata 316 such as an indication 406 or 408 or 410 or 412 where an action originated from, an actual or estimated time 604 indicating how long an action took, an error code 414 or other outcome 606 indicating whether an operation was successful, and so on. In particular, in some embodiments the action metadata 316 in the mitigation graph 210 includes at least one of the following: an indication 406 that an action associated with the action metadata originated internally within the development tool without being caused directly by a user interface interaction, or an identification 414 of an error caused by an action associated with the action metadata after the action was taken during a non-current development tool session (possibly a different user's session).

Depending on the current node, or current popular workflows, some embodiments add or update or utilize one or more weights 418 associated with respective edges 314, to inform the software 208 or the user 104 or both how likely 420 it is that a particular path 306 would be taken. This helps identify mitigation sequences 218, as over time and usage the paths 306 that have better outcomes 606 will tend to be taken more often. Thus, in some embodiments the mitigation graph 210 includes a weight 418 on an edge between a first mitigation graph node 312 representing a first action 220 or 224 and a second mitigation graph node 312 representing a second action 220 or 224, the weight representing a likelihood 420 that the first action and the second action will be performed consecutively, beginning with the first action.

In some embodiments, a productivity question or suggestion, or an error condition, occurring in the developer tool can automatically trigger a documentation server 322, and automatically open a browser 304 with documentation 324 that is contextualized to describe the next steps or otherwise mitigate a current problem. In some, the computing system 204 includes a documentation server 102, 322, 304 which is configured to synthesize documentation 324 based at least in part on the problem matching node 428, and format the synthesized documentation 324 for visual presentation 714 in the computing system. In some embodiments, interaction is facilitated by a bidirectional communication channel 422 between the documentation server 322, 102 and the developer tool 206.

In some embodiments, documentation 324 may describe a solution to a problem, or it may merely warn the user that particular problems may be present or are close, based on the actions 220 taken by the user and the internal tool state 228 and how they map to the graph 210. In some embodiments, a graph node—or a sequence of graph nodes—may have an associated list 432 of possible problems 430, and the listed problems may be ranked according to likelihood, or severity, or both.

Other system embodiments are also described herein, either directly or derivable as system versions of described processes or configured media, duly informed by the extensive discussion herein of computing hardware. Examples are provided in this disclosure to help illustrate aspects of the technology, but the examples given within this document do not describe all of the possible embodiments. An embodiment may depart from the examples. For instance, items shown in different Figures may be included together in an embodiment, items shown in a Figure may be omitted, functionality shown in different items may be combined into fewer items or into a single item, items may be renamed, or items may be connected differently to one another. A given embodiment may include or utilize additional or different data structures containing action metadata 316, technical features, operational sequences, machine 102 configurations in an enhanced system 204, security and user privacy protections, synthesizer 322 technologies, or user assistance functionalities for instance, and may otherwise depart from the examples provided herein.

Processes (a.k.a. Methods)

Figure 7:
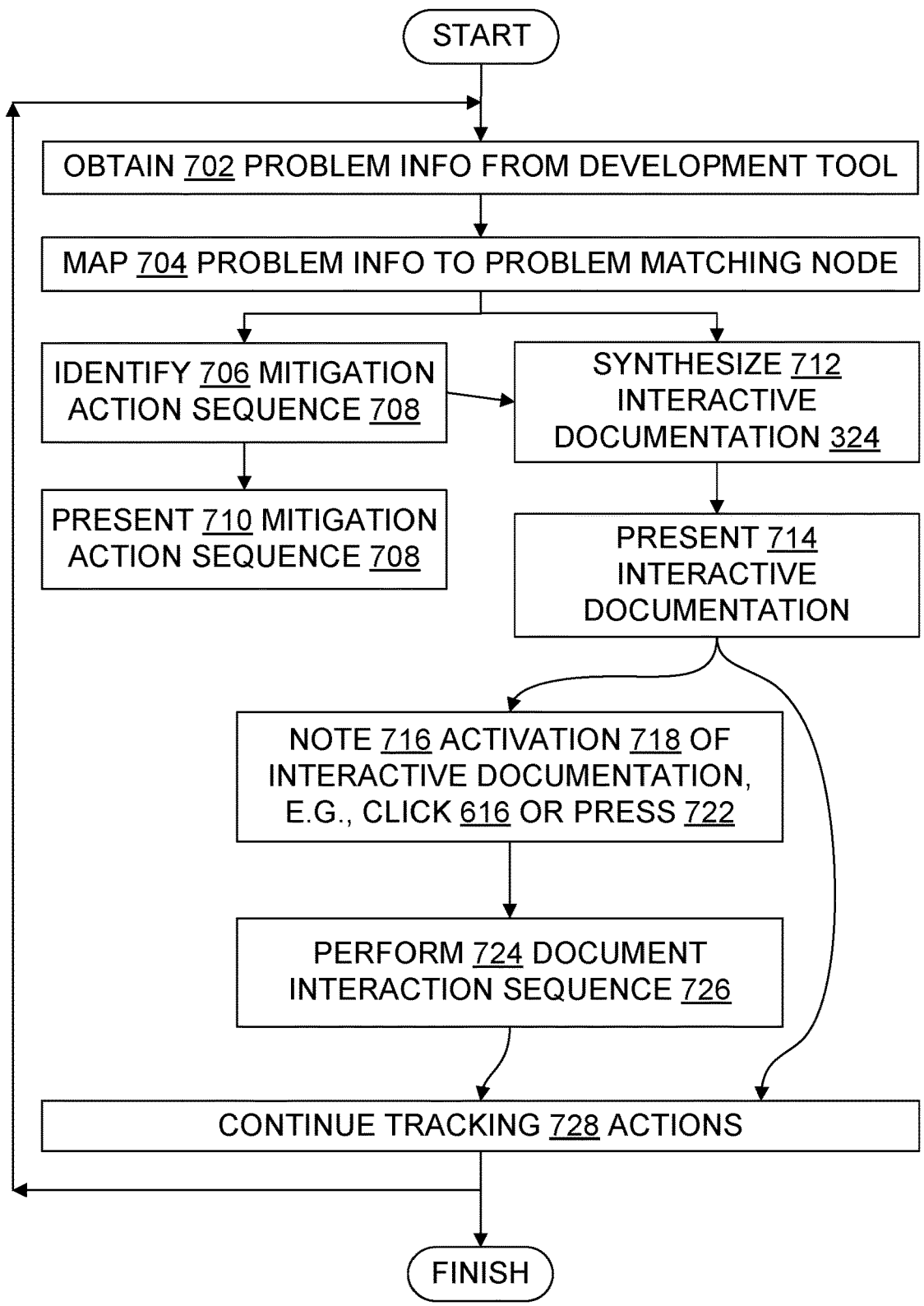
FIG. 7 is a flowchart illustrating steps in some development tool user assistance methods.
Figure 8:
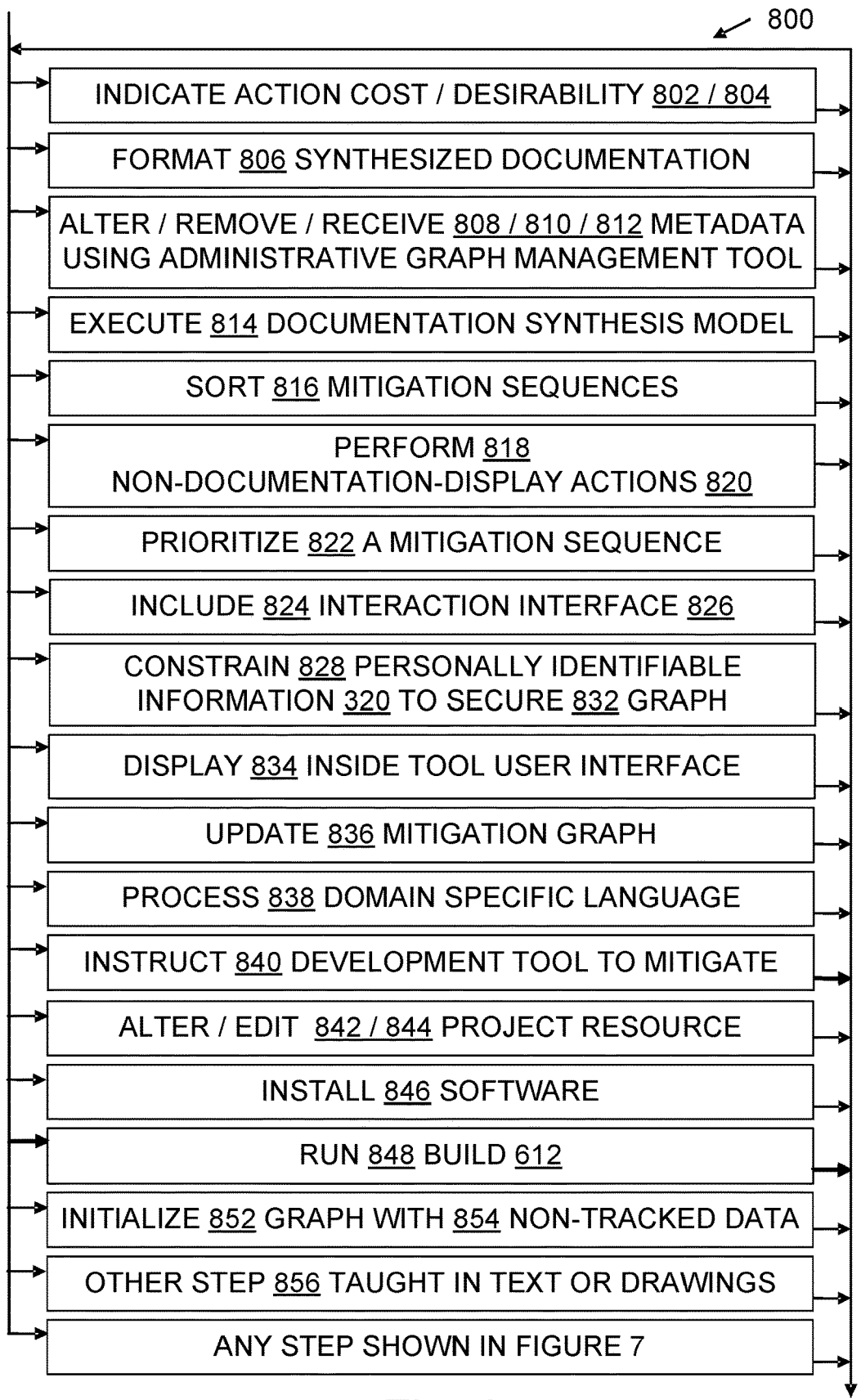
FIG. 8 is a flowchart further illustrating steps in some development tool user assistance methods.

FIG. 7 illustrates a family of methods 700 that may be performed or assisted by a given enhanced system, such as any system 204 example herein or another functionality 202 enhanced system as taught herein. FIG. 8 further illustrates development tool user assistance methods. FIG. 8 incorporates all steps shown in FIG. 7. Methods 700 or 800 may also be referred to as development tool user assistance "processes" in the legal sense of the word "process".

Technical processes shown in the Figures or otherwise disclosed will be performed automatically, e.g., by an enhanced system 204 or software component thereof, unless otherwise indicated. Processes may also be performed in part automatically and in part manually to the extent activity by a human person is implicated. For example, in some embodiments a human may trigger operation of development tool user assistance functionality, e.g., by pressing a "help" button or saying "assist me". But no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 7 and 8. Steps may be performed serially, in a partially overlapping manner, or fully in parallel. In particular, the order in which flowchart 700 or flowchart 800 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for development tool user assistance, including automatically: obtaining 702 development problem information from a development tool; mapping 704 the development problem information to a problem matching node in a mitigation graph which has multiple nodes, the mitigation graph nodes collectively representing actions by users during development tool sessions, the mitigation graph also containing action metadata which indicates action cost or action desirability or both; synthesizing 712 documentation based at least in part on the problem matching node and the action metadata; and visually presenting 714 the synthesized documentation to a current user of the development tool.

Various kinds of document synthesis technology may be adapted for use in an enhanced system 204, including machine learning (ML) technologies. Some embodiments utilize GPT-3 or another autoregressive language model 508 for contextual text generation of documentation. More generally, in some embodiments, synthesizing 712 documentation 324 includes at least one of the following: executing 814 a machine learning model 502, executing 814 an autoregressive language model 508, executing 814 a Markov chain model 506, or executing 814 a deep learning model 504.

In some embodiments, the documentation 324 is interactive, in that it does not merely display information, it also presents actionable information which the user 104 can activate, e.g., by clicking on a mitigation URL 402 or other interaction point 826 within the documentation and thereby triggering the functionality 202 to instruct the tool to perform some action 224. Documentation 324 may contain conventional hyperlinks that point to other documentation, but document display is not the only action triggerable by a mitigation URL 402. A mitigation URL 402 activates actions 224 within the developer tool itself. A mitigation URL 402 may upon activation talk directly to the developer tool, and activate a GUI within the tool, execute a workflow or a collection of actions, or edit code or project assets, based on previous data collected for the tool, so the edits and actions can be tailored to the individual user and the current problem.

In some embodiments, an assistance method 800 includes noting 716 an activation 718 of a uniform resource locator 402 which is displayed within the synthesized documentation 402 and in response to the activation performing at least one of the following document interaction sequences 726: instructing 840 the development tool to automatically perform a sequence of development problem mitigation actions which alter 842 a development project digital data resource 628, including at least one action 820 which is not a documentation display action; instructing 840 the development tool to automatically perform a sequence 306 of development problem mitigation actions without further input from the current user of the development tool, including at least one action 820 which is not a documentation display action; instructing 840 the development tool to automatically edit 844 a source code file 628; instructing 840 the development tool to automatically edit 844 a development project file 628; automatically installing 846 software; or automatically running 848 a build 612.

In some embodiments, obtaining 702 development problem information 214 from the development tool includes obtaining at least one of the following: action metadata indicating an action origination 602, action metadata indicating an action duration 604, action metadata indicating an action outcome 606, action metadata indicating an action visibility 608, or action metadata indicating an action error code 414.

In some embodiments and situations, the mitigation graph 210 is based entirely on actual user activity. But in other embodiments and situations, part of the graph 210 is generated from hypothetical actions that some user might take but has not yet apparently actually taken. In particular, some embodiments initialize 854 the mitigation graph with data 610 which is not generated from tracking 728 activity of the current user.

In some embodiments, the graph 210 links 314 contain metadata 316 describing a transition or trigger, e.g., a click 616, or data 414 indicating an action occurred because of an error. In some, nodes 312 will contain information about a user action 220 taken, e.g., a fixed enum describing an operation, an indication whether it was a build operation, or an indication that a dialog showed up. If an error occurred, a node's metadata may also contain information about the error.

In some embodiments, obtaining 702 development problem information 214 from the development tool includes obtaining at least one of the following kinds of action metadata 316: action metadata 618 indicating that an action included a click 618 as a user interface interaction, action metadata 618 indicating that an action resulted from a click 618 as a user interface interaction, action metadata 414 indicating that an action resulted from an error, action metadata 614 indicating that an action occurred as a build 612 operation, action metadata 614 indicating that an action resulted from a build 612 operation, action metadata 622 indicating that an action included a dialog 620 presentation, or action metadata 622 indicating that an action resulted from a dialog 620 presentation.

Some embodiments provide or utilize a graph administration tool 426, which an authorized administrator can use to tweak the mitigation graph 210 in various ways, e.g., to sort or prioritize the graph-based action sequences before presenting options to the user. In particular, some embodiments include at least one of the following and then present 714 at least one development problem mitigation action to the current user: altering 808 metadata in the mitigation graph by operation of an administrative graph management tool 426 that is not available for use by the current user, removing 810 metadata from the mitigation graph by operation of an administrative graph management tool 426 that is not available for use by the current user, or receiving 812 metadata into the mitigation graph through an administrative graph management tool 426 that is not available for use by the current user.

Some embodiments include at least one of the following and then present 714 at least one development problem mitigation action to the current user: sorting 816 a plurality of development problem mitigation action sequences, or prioritizing 822 a development problem mitigation action sequence. For example, mitigation action sequences may be sorted according to computational cost 624, number of user actions 220, or popularity. A user who prefers a certain characteristic, e.g., fewer clicks, can also prioritize mitigation action sequences based on that characteristic.

In some embodiments and situations, the problem information may include data 226 or 228 that reveals or suggests personally identifiable information 320, e.g., a user's full name, email address, work phone number, or the like. In some scenarios, such as those involving trade secret or classified or health information, details about a user's current work could also include or suggest PII 320. Knowing which project or repository or file the user has open, for example, could narrow the scope of possible geographic locations of the user or the list of possible job titles of the user. Accordingly, some data may be anonymized, excluded, or otherwise constrained 828 from use as action metadata 316. Network addresses may be hashed, and email addresses may be used as metadata 316 only internally within an organization, for example. Some embodiments anonymize, hash, or exclude personally identifiable information which is accessible to the development tool, thereby securing 832 the mitigation graph against inclusion of unprotected personally identifiable information.

As one of skill will appreciate from the present disclosure, functionality 202 may be particularly useful with tools 206 that are complex. One way to measure tool complexity is by the size of the interactive action sequences the functionality 202 provides in the synthesized documentation 324. In some embodiments, the synthesized documentation includes a development problem mitigation uniform resource locator 402, and the embodiment notes 716 an activation of the development problem mitigation uniform resource locator, and in response to the activation the embodiment automatically performs a sequence of development problem mitigation actions which includes at least three actions 820 that are not documentation display actions.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as assistant software 208, action metadata 316, a mitigation graph 210, interactive synthesized documentation 324, and a document synthesis model 404, in the form of data 118 and instructions 116, read from a removable storage medium 114 and/or another source such as a network connection, to form a configured storage medium. The configured storage medium 112 is capable of causing a computer system 102 to perform technical process steps for development tool user assistance through contextualized document synthesis, as disclosed herein. The Figures thus help illustrate configured storage media embodiments and process (a.k.a. method) embodiments, as well as system and process embodiments. In particular, any of the process steps illustrated in FIG. 7 or 8 or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for development tool user assistance. This method includes: obtaining 702 development problem information 214 from a development tool 206; mapping 704 the development problem information to a problem matching node 428, 312 in a mitigation graph 210 which has multiple nodes 312, the mitigation graph nodes collectively representing actions 220 by a set of users 104 and multiple development tool sessions 310, the mitigation graph also containing action metadata 316 which indicates action cost 624 or action desirability 626 or both; selecting 706 a development problem mitigation action sequence 708 based on the action metadata; synthesizing 712 interactive contextual documentation 324 based at least in part on the problem matching node and the action metadata, the synthesized interactive contextual documentation including at least one interaction interface 826 for activation of the development problem mitigation action sequence; and visually presenting 714 the synthesized interactive contextual documentation to a current user of the development tool.

In some embodiments, the synthesized documentation 324 appears inside the development tool user interface 222. That is, visually presenting 714 the synthesized interactive contextual documentation to a current user of the development tool includes displaying 834 the synthesized interactive contextual documentation inside a user interface 222 of the development tool. Some other embodiments display 714 the synthesized documentation inside a browser window that is outside the development tool 206.

Some embodiments continually update 836 the graph 210 as the user operates the development tool. In particular, in some embodiments a method 800 includes repeatedly automatically and proactively updating 836 the mitigation graph 210 to represent recent interactions 220 of the development tool with the current user, as the current user interacts with the development tool over a period of at least ten minutes. Other periods than a ten minute period are used in some embodiments or some situations, but it is contemplated the time period used will be of a length permitting functionality 202 to capture 728 user telemetry 226 during most user sessions 310 for a given kind and configuration of development tool 206.

Also, in some embodiments a method 800 includes repeatedly automatically and proactively updating 836 the mitigation graph 210 over a period of at least thirty minutes to represent internal actions 224 of the development tool which are not in a one-to-one correspondence with user interactions 220. For example, some embodiments continually update the graph with internal actions of the development tool reflecting autocompletion database updates or other data cleaning, virus signature updates, garbage collection, checks for updates, polling, heartbeat, timeout, logging, and other internal tool state information. Other periods than a thirty minute period are used in some embodiments or some situations, but it is contemplated the time period used will be of a length permitting functionality 202 to capture 728 internal telemetry 228 during most user sessions 310 for a given kind and configuration of development tool 206.

Some embodiments support a formal description of the mitigation graph which is used, e.g., to define initialization data 610 or guide use 808, 810, 812 of a graph administration tool 426. In particular, in some embodiments updating 836 the mitigation graph includes processing 838 content written in a domain specific language 424.

Technical Character

The technical character of embodiments described herein will be apparent to one of ordinary skill in the art, and will also be apparent in several ways to a wide range of attentive readers. Some embodiments address technical activities such as digitally obtaining 702 telemetry data 226, 228, computationally mapping 704 problem information 214 to one or more nodes 312 of a mitigation graph 210 data structure, computationally synthesizing 712 contextualized digital documentation 324, computationally noting 716 an activation 718 in an enhanced computing system 204 of an interaction interface 826 and in response proactively performing 724 a mitigation sequence 726, and updating 836 a mitigation graph 210 data structure, each of which is an activity deeply rooted in computing technology. Some of the technical mechanisms discussed include, e.g., document synthesis models 404, bidirectional communication channels 422, mapper software 212, PII filters 318, interaction interfaces 826, assistance software 208, and graph administration software 426. Some of the technical effects discussed include, e.g., documentation 324 that is contextualized to a current user's particular problem, interactive contextualized documentation 324, and reduction in user time and computational resources spent locating and searching through technical documentation that is not specific to a particular problem at hand. Thus, purely mental processes are clearly excluded. Other advantages based on the technical characteristics of the teachings will also be apparent to one of skill from the description provided.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments include a local documentation server subsystem 322. This can include a local HTTP or HTTPS server 436, which hosts the documentation 324. The server can run on a port such as port 3045. A user can access the documentation locally from any installed browser 434. A local browser can be automatically be opened on the HTTP server URL, on a request from the system, on an error condition, or when help is requested from the developer tool for which the documentation system is implemented.

Some embodiments include a documentation service 438 hosted in a cloud and widely accessible. The service is responsible for communicating with the developer tool 206 and the documentation server 436. This service is where information 214 from the developer tool, across all users 104, is collected. The service 438 maintains a graph database 210, e.g., using an Azure Cosmos DB® SaaS or similar technology, which stores all the nodes 312 and edges 314, with associated metadata 316 (mark of Microsoft Corporation). The service 438 is responsible for data collection 702, 728 from the developer tool, for analysis 704, 706, of the data, and for documentation synthesis 712.

In some embodiments, the developer tool 206 is the central tool which a developer 104 or an engineer 104 interacts with, and for which documentation 324 is provided. Some of the many possible examples of the developer tool 206 which may be part of an enhanced system 204 are an IDE, a CAD tool, a compiler, or another developer or engineering tool with a complex interface and multiple workflows.

In some embodiments, code and frequently used call sites in the developer tool 206 are instrumented manually or automatically, such that as a user interfaces with the developer tool, the instrumented code emits the data 226 onto the documentation service 438. As the developer tool is used, the graph database 210 in the documentation service keeps updating 836. Nodes 312 represent actions 220 taken by the user in the developer tool, with metadata 316 about where it originated from, how long it took, was the operation successful, did the action have a GUI or ran internally, if the operation failed, what was the cause of the error, etc. This graph 210 is also accessible for manual edits 808, 810, 812, e.g., one may insert new nodes and add or refine the metadata describing an operation.

In the graph 210, there will be a finite number of transitions and connections between the code, and it will be possible to predict possible new actions a user might take. Depending on the current node, or current popular workflows, an embodiment may include a weight on the edges, to inform a path selector 216 how likely it is that a given path 218 might be taken.

Developer tools 206 are often complex, permitting many ways 218 of attacking a given problem 430. There may be many options or knobs to turn on or off, even while there are limited ways the tool can be configured. With enough rich information 316 stored in the graph 210, an embodiment can track issues in the developer tool, and observe how users have unblocked or continued in their workflow after error conditions. An admin may also update the graph manually, to add a new workflow or adjust a way of using the tool. Based on usage patterns, an embodiment may instruct users about the next path to take, in view of the current state of the tool. The embodiment may guide a user to or along a path to success, allowing the user to avoid the frustration of looking through irrelevant documentation in the hope of finding the relevant parts, thus significantly improving productivity compared with systems that are limited to static non-contextual documentation.

In some embodiments, as issues or patterns emerge for any specific user, the embodiment is also able to make productivity suggestions that take a user on a better path. In conjunction with a productivity suggestion, or an error condition, the enhanced developer tool can automatically trigger 712 the documentation server, and open a browser with documentation that will be contextual and describe the next steps or otherwise mitigate the current problem. When documentation is presented in the system, it may be formatted 806 in HTML, and it may contain text, images, and hyperlinks. In static documentation systems, hyperlinks link to other documentation. This may also be done in an enhanced system but in addition the hyperlinks can be interactive points 826 that activate various actions 224 within the developer tool itself. An interaction point 826 can communicate directly with the enhanced developer tool, e.g., to activate a GUI within the tool, execute a workflow or a collection of actions, or edit code or other project assets, based on previous data collected for the tool, so the edits and actions can be tailored to an individual user. The interaction is facilitated by bidirectional communication 422 between the documentation server and the developer tool, e.g., via packets, remote procedure calls, scripts, XML, JSON, or other mechanisms. This interaction may be viewed as including an automatic generation of a user-tailored interactive blog post, which is contextual, containing images and actions.

In some embodiments, the documentation actions and images can be synthesized using a machine learning model. A model like GPT-3 could be utilized for contextual text generation from existing documentation. Images can be synthesized by using an automation interface to the tool to replay actions and record them. Actions on the links may be manually or automatically tagged within the tool. The text may be synthesized by creating textual descriptions in a database, with various keywords, and then combining it based on relevance.

In some embodiments, an Overview documentation page is presented 714 inside the tool in a GUI, for example as a docked document in a tabbed system. This Overview page contains contextual information and documentation, actualized using current context and details from a project system such as an IDE. The documentation is also interactive and interacting with it will interact with the IDE, thus not only providing information, but also providing actions through the documentation. A user may interface using text, buttons and hyperlinks, whereon the document 324 communicates directly with the IDE and a loaded project, including altering state in the project's resources.

In some embodiments the content 324 loaded is contextual and can branch out and self-actualize without visible refresh in place, depending on the user's actions. The content and action triggers 826 for the content or sections of the content can also update from the internet, and be used for communicating issues as users encounter them, thus directing users to workarounds that, once initiated, can be self-applying. The documentation system being interactive allows the user, through the documentation system, to not merely read documentation, but to actually execute actions 220, 224 through the documentation and thereby fix problems or explore mitigation options.

Some embodiments include intelligence gathering. Every action 220 performed by a user in the tool is tagged and recorded on a central place, and a mitigation graph 210 of such actions is built and maintained centrally for all tracked users. Each action is tagged and correlated with additional semantic metadata. The tool is modified to generate such data, e.g., by the authors of the tool who know which code corresponds to what actions. Some user actions that consume user input, e.g., as configuration files or code, will also be classified with their intelligence 226 uploaded as metadata to the actions.

In some embodiments, a subgraph of actions provides a basis from which the embodiment synthesizes textual documentation. References to documentation and tagging on how the tool works can be maintained in a database, and then automatically be combined by the system, based on the tags and actions. Machine learning may be employed for combining such information, and to synthesize the textual documentation.

When another user encounters a problem or needs help, the documentation system can tap into the central intelligence graph 210, and when given a current live graph 210 for the current user, it can map to what branches 218 other users have taken, and expose the intelligence to the current user as synthesized documentation 324.

Some embodiments perform retention analysis, such that users' intentions are observed, and weights are associated to actions that are problematic in a tool or need more attention.

One embodiment may be utilized as part of a Linux® software development experience (mark of Linus Torvalds). Suppose an IDE overview page is open and no projects are loaded. The overview page may contain text explaining general details of cross platform programming, e.g., a development project may target environments involving Linux®, CMake®, Windows®, Clang tools, etc. (marks of Linus Torvalds, Kitware, Inc., Microsoft Corporation, respectively). Once a Linux MSBuild project is created, the text content of the page expands with more text saying, e.g., "The Linux® experience allows development for Linux® environments etc. Use SSH to target Linux . . . . For compilation use g++, gcc, etc. For debugging use gdb and gdbserver. For copying use rsync or sftp."

Tools such as g++ and gcc are invokable by hyperlinks 402. If a machine 102 is detected as one configured into the project, the embodiment will check whether the tools are installed on it, and reflect the result as yes/no using green or red. If the hyperlink 402 shows as red and tools are not installed then embodiment does not show any more content or info about the non-present features. If users click on a red hyperlink 402, the embodiment will install the tools, and show as green. Then the embodiment appends content 324 explaining the remaining features and details.

Some embodiments described herein may be viewed by some people in a broader context. For instance, concepts such as community, connection, difficulty, help, or knowledge may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to present documentation that is relevant to a particular problem encountered by a user of a development tool. Other configured storage media, systems, and processes involving community, connection, difficulty, help, or knowledge are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating environments, problems 430, architectures, metadata 316 examples, development tool 206 examples, document relevance examples, software processes, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPT-3: generative pre-trained transformer third generation
GPU: graphical processing unit
GUI: graphical user interface
HTML: hypertext markup language
HTTP: hypertext transfer protocol
HTTPS: hypertext transfer protocol secure
IaaS or IAAS: infrastructure-as-a-service
ID: identification or identity
IP: internet protocol
JSON: JavaScript object notation
LAN: local area network
OS: operating system
PaaS or PAAS: platform-as-a-service
PII: personally identifiable information
RAM: random access memory
ROM: read only memory
TCP: transmission control protocol
TPU: tensor processing unit
UEFI: Unified Extensible Firmware Interface
URL: uniform resource locator
WAN: wide area network
XML: extensible markup language Note Regarding Hyperlinks Portions of this disclosure contain or discuss URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01(VII).

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. User assistance proxies may be implemented with services or accessed via services, for example.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Development tool user assistance operations such as tracking 728 user actions 220 and internal tool actions 224, executing 814 machine learning models 502, displaying 834 documentation, installing 846 software, editing 844 digital resources 628, altering 808 mitigation graph 210 data structures, and many other operations discussed herein, are understood to be inherently digital. A human mind cannot interface directly with a CPU or other processor, or with RAM or other digital storage, to read and write the necessary data to perform the development tool user assistance steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, editing, executing, formatting, identifying, initializing, installing, instructing, mapping, noting, obtaining, performing, presenting, processing, receiving, running, sorting, synthesizing, tracking, updating (and alters, altered, edits, edited, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., an analyst or other user of an enhanced system 204
106 peripherals
108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, browsers, and so on
124 applications, e.g., word processors, web browsers, spreadsheets, games, email tools, commands
126 display screens, also referred to as "displays"
128 computing hardware not otherwise associated with a reference number 106, 108, 110, 112, 114
202 development tool user assistance functionality, e.g., one or more of the following: mitigation graph 210, mapper 212, mitigation sequence selector 216, assistant software 208, contextual document synthesizer 322, mitigation graph admin tool 426, any method 700 or 800 or software or system configured to perform such a method, or any other innovation described herein
204 enhanced development computing system, e.g., one or more computers 102 enhanced with development tool user assistance functionality, or computers which perform a method 700 or 800
206 development tool, e.g., tool 122, application 124, or any other tool described herein as a development tool or matching the description herein of a development tool
208 assistant software, also referred to, e.g., as "assistant" or "assistance software"
210 mitigation graph data structure, or a database having content representing a mitigation graph data structure
212 mapper which maps problem info 214 to one or more matching nodes 312; mapping may include, e.g., measuring distance between current metadata values for a particular user and metadata in the mitigation graph 210 according to a cosine metric or other vector distance metric, a Hamming distance metric, a Levenshtein distance metric, or another distance metric
214 problem info, e.g., metadata 316 values for a particular user at a particular point in a tool 206 usage session; may also include a full or partial history of user actions 220 or internal tool actions 224 or both
216 selector which selects one or more mitigation sequences to present to a user facing a problem 430; selecting may include, e.g., consideration of any priorities 822 specified by the user, as well as outcomes 606, costs 624, and relative likelihoods 420 that other users followed a particular sequence 218
218 mitigation sequence, e.g., a sequence of actions 220 or 224 to be followed to mitigate a problem 430
220 user action, e.g., interaction with tool user interface 222
222 tool user interface
224 internal action within tool, not necessarily a direct result of a user action 226 event data logged or otherwise tracked that includes user actions
228 event data logged or otherwise tracked that includes internal tool actions
302 interface generally
304 presenter, e.g., software or hardware that present or display documentation; may also include code for formatting documentation and for connecting scripts or callbacks in order to implement mitigation URLs
306 action sequence, e.g., a sequence of user actions or internal tool actions or both
308 raw data, e.g., logs, packet captures, traces
310 development tool session, e.g., usage of a development tool from login to logout, or during a particular period of wall clock time, or during work on a particular project
312 mitigation graph node data structure
314 mitigation graph edge (a.k.a. "link") data structure
316 action metadata (digital)
318 PII filter code
320 PII
322 documentation synthesizer code; may include, e.g., document assembly software driven to assemble documentation snippets associated with a given graph node 312 or with a given machine learning recognized pattern of metadata or actions or both
324 documentation (digital)
400 aspect of a system that is enhanced to include functionality 202
402 mitigation URL in a synthesized document 324 which upon activation by a user performs one or more non-document display actions 820 in an effort to help reduce or eliminate ("mitigate") a development problem 430 that is context discussed in the synthesized document 324; an example of an interaction interface 826
404 document synthesis model, e.g., a machine learning model or other software (including API or other programmatic interface) which upon execution in a system 102 performs document synthesis; may include, e.g., code for automatic text generation, retrieval based text generation, document assembly, document preparation using templates, PROSE (program synthesis using examples) or other program synthesis with natural language text inputs for natural language synthesis
406 digital value indicating an action 224 that originated internally in a tool, as opposed to being a direct response to a user action 220
408 digital value indicating an is a direct response to a user action 220, as opposed to being an action 224 that originated internally in a tool
410 session ID fora session in which an action or action metadata originated
412 user ID for whichever user was the current user during a session in which an action or action metadata originated
414 error code or other error identifier
416 error, e.g., user error, syntax error, input invalid, unexpected operation, timeout, warning, failure, or other undesirable condition detected by a system 102
418 weight (digital value), e.g., indication of relative importance
420 likelihood, e.g., probability, anomalousness score, relative frequency, or relative recency
422 bidirectional communication channel in a system 102; may be implemented using, e.g., sockets, ports, callbacks, shared memory, APIs, or other digital mechanisms
424 domain specific language, e.g., for describing status or goals or both in the context of a graphic design program, or a CAD program, or another domain the development tool 206 targets
426 graph administration tool; also referred to as "graph management tool"; e.g., software with a graphical user interface which facilitates administration 808, 810, 812 of a mitigation graph 210 by translating graph content into human-viewable form and by translating tool 426 user actions into digital graph 210 content
428 node 312 in a mitigation graph 210 that most closely matches the problem info 214 of a current user 104 of a tool 206
430 problem faced by a current user 104 of a tool 206, e.g., how to accomplish a desired operation (build, run, edit, update, data recovery, test, etc.) in a project
432 list of problems, e.g., data structure including a list of problem identifiers
434 browser, e.g., web browser
436 server, e.g., server software and supporting hardware
438 service, e.g., cloud-based functionality implemented using servers and available to multiple users
502 machine learning model
504 deep learning model
506 Markov chain model
508 autoregressive language model
600 aspect of metadata 316
602 action origin (digital value) indicating, e.g., user, session, tool, network, date, or other identification of an action's origin
604 action duration (digital value) indicating, e.g., how long an action lasted, in wall clock time or processor time or transactions count or I/O operations or another metric
606 action outcome, e.g., error code, success code, previously unavailable operation now permitted, reduction or growth in resource usage, creation of new or altered resource
608 action visibility, e.g., whether action is reflected in or reported by user interface 222
610 graph initialization data, e.g., data 118 result of aggregating or summarizing data 308, or autogenerated data 118 to seed the graph 210
612 software build (noun or verb)
614 involvement of software build, e.g., an action 224 or 220 which facilitates or results from or occurs during a build
616 key click or mouse click or similar user action in user interface 222
618 involvement of click, e.g., an action 224 or 220 which facilitates or results from or detects a click
620 dialog mechanism in a user interface 222
622 involvement of dialog, e.g., an action 224 or 220 which displays or feeds or reads a dialog or its input
624 cost, e.g., in processor cycles, memory size, network bandwidth, I/O performed, electrical energy consumed, etc.; may also or in addition indicate user cost, e.g., average user wall clock time, user clicks performed, user satisfaction per survey results, etc.
626 action sequence desirability, e.g., in terms of cost 624, security risk, remaining distance (e.g., cost, number of actions) to desired outcome 606
628 resource, e.g., computational resource generally, network resource, storage resource, processing resource, user time, available number of transactions, etc.
630 digital value(s) identifying a resource 628

700 flowchart; 700 also refers to development tool user assistance methods illustrated by or consistent with the FIG. 7 flowchart 702 obtain problem info from development tool; performed computationally; obtaining 702 may include, e.g., parsing, cleaning, filtering or similar data extraction operations on event data 226, 228 from logs or packet captures or telemetry to get problem info 214 from raw data 226 and 228, and obtaining 702 may also include transmitting digital problem info 214 over a network or via shared memory or shared files or other computer communication mechanism(s) to put the problem info 214 where the mapper 212 seeks it 704 map problem info to node(s) or edge(s) or both in mitigation graph 210; performed computationally; may include, e.g., measuring distance between metadata of current state in user session and metadata stored in mitigation graph representing prior sessions 706 identify mitigation action sequence; performed computationally; may include, e.g., selecting all mitigation action sequences that start with the problem matching node, or all mitigation action sequences that include with the problem matching node; instead of all mitigation action sequences, an embodiment may select for subsequent presentation 710 or 714 only the top N sequences after sorting 816 sequences that contain/start at the matching node, e.g., "here are the top three suggestions for responding to your current problem"

708 mitigation action sequence, as defined, e.g., by actions 220 or 224 or both that are represented by a connected ordered set of nodes 312 in a mitigation graph 210; a mitigation action sequence may be constrained in length by maximum number of nodes (e.g., five) or by a maximum cost (e.g., six user actions, or one minute of wall clock time to execute)

710 present a mitigation action sequence to a user, e.g., by displaying the sequence's actions on a screen 712 synthesize documentation 324 (which is not necessarily interactive); performed computationally by a synthesizer 322

714 present documentation 324 to a user, e.g., by displaying the documentation 324 on a screen 716 note activation of an interaction point 826; performed computationally, e.g., by an event handler connected to a GUI that displays interactive documentation 718 activation of an interaction point 826, e.g., click on a UNRL, press of a button 722 press of a button in a GUI 724 computationally perform a document interaction sequence in response to activation of an interaction point 826

726 document interaction sequence, e.g., a sequence of tool actions 220 or other automated actions (e.g., a build, install, or other command script) that is associated with an interaction point 826 data structure; an example of a mitigation sequence 708

728 track actions, e.g., by tool instrumentation 800 flowchart; 800 also refers to development tool user assistance methods illustrated by or consistent with the FIG. 8 flowchart (which incorporates the steps of FIG. 7)

802 indicate an action cost, e.g., set or read a variable or other data structure value that represents a cost 624 of performing an action 220 or 224

804 indicate an action desirability, e.g., set or read a variable or other data structure value that represents a desirability 626 of an action 220 or 224

806 format synthesized documentation, e.g., embed text in a web page or other displayable format 808 alter (e.g., change value of) metadata 316; performed computationally by operation of a graph admin tool 426

810 remove (e.g., delete or inactivate or disable access to) metadata 316; performed computationally by operation of a graph admin tool 426

812 receive (e.g., set value of, enable access to, activate) metadata 316; performed computationally by operation of a graph admin tool 426

814 computationally execute a document synthesis model, e.g., run a synthesizer 322

816 sort mitigation sequences according to cost, desirability, length, or other criteria; performed computationally 818 computationally execute one or more actions 820 which are not required per se in order to display text or images 820 computational actions which are not required per se in order to display text or images 822 prioritize a mitigation sequence; performed computationally 824 include an interaction interface in documentation 324, thereby making the documentation be interactive 826 interaction interface in documentation 324; also referred to as "interaction point"; may include, e.g., an URL or button connected to an interaction sequence 726 script or code or command launcher 828 computationally constrain the presence of PII 320 in a mitigation graph; may include, e.g., filtering out or summarizing or anonymizing or tokenizing data 226 or 228 when forming or updating problem info 214, or filtering out or summarizing or anonymizing or tokenizing problem info 214 when initializing or updating a mitigation graph, or both 832 computationally secure a mitigation graph with respect to PII, e.g., by constraining 828 PII, encrypting the mitigation graph, requiring authentication and authorization, or a mixture thereof 834 computationally display documentation 324 inside a tool's user interface 222, e.g., in a dialog or window 836 computationally update a mitigation graph, e.g., by adding, removing, or changing values for one or more nodes 312, edges 314, metadata 316, or weights 418 of the mitigation graph 838 computationally process a domain specific language, e.g., to create initialization data 610 or get data 118 that is then used to update 836 a mitigation graph 840 computationally instruct a development tool to perform internal actions 224 or to proactively and automatically perform user actions 220; may include, e.g., use of tool test automation software adapted to receive and be guided by actions listed in a mitigation sequence or a document interaction sequence or both 842 computationally alter a digital resource 628, e.g., by creating it, editing to change one or more values in it, encrypting it, compressing it, or deleting it 844 computationally edit a digital resource 628 to change one or more values in it 846 computationally install software (new or update) in a system 102

848 computationally build software (new or updated) in a system 102

852 computationally initialize a mitigation graph; may use actual session data or generated data that does not match any actual session 854 computationally initialize a mitigation graph with data 610 which is not generated from tracking 728 activity of the current user 856 any step discussed in the present disclosure that has not been assigned some other reference numeral

CONCLUSION

In short, the teachings herein provide a variety of development tool user assistance functionality functionalities 202 which operate in enhanced systems 204. Some embodiments track 728 internal actions 224 of a development tool 206, and actions 220 of a user 104 of the tool's GUI 222. When the user faces a problem 430 while using the tool 206, information 214 about the problem state (e.g., recent user actions 220 and internal actions 224) is matched 704 to a node 312, 428 in a mitigation graph 210; the mitigation graph 210 was built 836 from other user's sessions 310 with the tool 206. Then documentation 324 which is contextualized to the current problem 430 is synthesized 712, e.g., using machine learning models 502 or other document synthesis models 404 such as snippet assembly. The synthesized documentation 324 is presented 710 or 714 to the user, with mitigation sequence 708 content relevant (i.e., contextualized) to the current problem info 214. In addition to text and images, the documentation 324 may include interaction points 826 such as hyperlinks 402 or buttons associated with code that mitigates 724 the problem 430. For example, a mitigation sequence 726 may proactively instruct 840 the tool 206 to perform 724 certain actions 224 such as an install 846 or build 612 or undo, or may automatically operate 724 the tool user interface 222 proactively in place of the user 104. Mitigation sequences 708, 726 may be sorted 816, and may be subjected to cost 624 or outcome desirability 626 prioritization 822. An administration tool 426 may provide mitigation graph 210 management functionality for administrative users. Personally identifiable information 320 presence is constrained 828, e.g., by filters 318.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other vendors.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 and 8 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for development tool user assistance, the system comprising:
   a digital memory;
   a processor in operable communication with the digital memory;
   a development tool configured to operate using the digital memory and the processor; and
   wherein the processor is configured to perform development tool user assistance steps which include (a) computationally obtaining development problem information of a development problem of a current user from or in the development tool during a current development tool session, (b) computationally mapping the development problem information to a problem matching node in a mitigation graph data structure which has multiple nodes and resides in the digital memory, the mitigation graph nodes collectively representing interactions of a user interface of the development tool with at least one other user during at least one development tool session other than the current development tool session, the mitigation graph data structure also containing action metadata which indicates at least one of: an interaction cost, an action sequence cost, an action sequence desirability, or an interaction desirability, (c) based at least in part on the problem matching node and the action metadata, computationally identifying at least one action sequence for mitigating the development problem, and (d) computationally and visually presenting the at least one action sequence in the user interface of the development tool.

2. The system of claim 1, wherein the action metadata in the mitigation graph data structure includes at least one of the following:
   an indication that an action associated with the action metadata originated internally within the development tool without being caused directly by a user interface interaction; or
   an identification of an error caused by an action associated with the action metadata after the action was taken during a non-current development tool session.

3. The system of claim 1, wherein the mitigation graph data structure includes a weight on an edge between a first mitigation graph data structure node representing a first action and a second mitigation graph data structure node representing a second action, the weight representing a likelihood that the first action and the second action will be performed consecutively, beginning with the first action.

4. The system of claim 1, wherein the computing system further includes a documentation server which is configured to do the following:
   synthesize documentation based at least in part on the problem matching node; and
   format the synthesized documentation for visual presentation in the computing system.

5. The system of claim 4, wherein the computing system further includes a bidirectional communication channel between the documentation server and the development tool.

6. A method for development tool user assistance, the method comprising:
   computationally obtaining development problem information of a development problem of a current user from or in a development tool during a current development tool session;
   computationally mapping the development problem information to a problem matching node in a mitigation graph data structure which has multiple nodes and resides in a digital memory, the mitigation graph nodes collectively representing interactions of a user interface of the development tool with at least one other user during at least one development tool session other than the current development tool session, the mitigation graph data structure also containing action metadata which indicates at least one of: an interaction cost, an action sequence cost, an action sequence desirability, or an interaction desirability;

computationally synthesizing documentation based at least in part on the problem matching node and the action metadata; and computationally and visually presenting the synthesized documentation in the user interface of the development tool.

7. The method of claim 6, wherein synthesizing documentation comprises at least one of the following:
    executing a machine learning model;
    executing an autoregressive language model;
    executing a Markov chain model; or
    executing a deep learning model.

8. The method of claim 6, further comprising noting an activation of a uniform resource locator which is displayed within the synthesized documentation and in response to the activation performing at least one of the following document interaction sequences:
    instructing the development tool to automatically perform a sequence of development problem mitigation actions which alter a development project digital data resource, including at least one action which is not a documentation display action;
    instructing the development tool to automatically perform a sequence of development problem mitigation actions without further input from the current user of the development tool, including at least one action which is not a documentation display action;
    instructing the development tool to automatically edit a source code file;
    instructing the development tool to automatically edit a development project file;
    automatically installing software; or
    automatically running a build.

9. The method of claim 6, wherein obtaining development problem information from the development tool comprises obtaining at least one of the following:
    action metadata indicating an action origination;
    action metadata indicating an action duration;
    action metadata indicating an action outcome;
    action metadata indicating an action visibility; or
    action metadata indicating an action error code.

10. The method of claim 6, further comprising initializing the mitigation graph data structure with data which is not generated from tracking activity of the current user.

11. The method of claim 6, wherein obtaining development problem information from the development tool comprises obtaining at least one of the following:
    action metadata indicating that an action included a click as a user interface interaction;
    action metadata indicating that an action resulted from a click as a user interface interaction;
    action metadata indicating that an action resulted from an error;
    action metadata indicating that an action occurred as a build operation;
    action metadata indicating that an action resulted from a build operation;
    action metadata indicating that an action included a dialog presentation; or
    action metadata indicating that an action resulted from a dialog presentation.

12. The method of claim 6, further comprising at least one of the following and then presenting at least one development problem mitigation action to the current user:
    altering metadata in the mitigation graph data structure by operation of an administrative graph management tool that is not available for use by the current user;
    removing metadata from the mitigation graph data structure by operation of an administrative graph management tool that is not available for use by the current user; or
    receiving metadata into the mitigation graph data structure through an administrative graph management tool that is not available for use by the current user.

13. The method of claim 6, further comprising at least one of the following and then presenting at least one development problem mitigation action to the current user:
    sorting a plurality of development problem mitigation action sequences; or
    prioritizing a development problem mitigation action sequence.

14. The method of claim 6, further comprising anonymizing, hashing, or excluding personally identifiable information which is accessible to the development tool, thereby securing the mitigation graph data structure against inclusion of unprotected personally identifiable information.

15. The method of claim 6, wherein the synthesized documentation includes a development problem mitigation uniform resource locator, and the method comprises noting an activation of the development problem mitigation uniform resource locator, and in response to the activation automatically performing a sequence of development problem mitigation actions which includes at least three actions that are not documentation display actions.

16. A computer-readable storage medium configured with data and instructions which upon execution by a processor cause a computing system to perform a method for development tool user assistance, the method comprising:
    computationally obtaining development problem information of a development problem of a current user from or in a development tool during a current development tool session;
    computationally mapping the development problem information to a problem matching node in a mitigation graph data structure which has multiple nodes and resides in a digital memory of the computing system, the mitigation graph data structure nodes collectively representing interactions of a user interface of the development tool with users in a set of users and multiple development tool sessions, the mitigation graph data structure also containing action metadata which indicates at least one of: an interaction cost, an action sequence cost, an action sequence desirability, or an interaction desirability;
    computationally selecting a development problem mitigation action sequence based on the action metadata;
    computationally synthesizing interactive contextual documentation based at least in part on the problem matching node and the action metadata, the synthesized interactive contextual documentation including at least one interaction interface for activation of the development problem mitigation action sequence; and
    computationally and visually presenting the synthesized interactive contextual documentation in the user interface of the development tool.

17. The storage medium of claim 16, wherein visually presenting the synthesized interactive contextual documentation to a current user of the development tool includes displaying the synthesized interactive contextual documentation inside a user interface of the development tool.

18. The storage medium of claim 16, further comprising repeatedly automatically and proactively updating the mitigation graph data structure to represent recent interactions of the development tool with the current user, as the current user interacts with the development tool over a period of at least ten minutes.

19. The storage medium of claim 16, further comprising repeatedly automatically and proactively updating the mitigation graph data structure over a period of at least thirty minutes to represent internal actions of the development tool which are not in a one-to-one correspondence with user interactions.

20. The storage medium of claim 16, further comprising updating the mitigation graph data structure at least in part by processing content written in a domain specific language.

* * * * *